July 18, 1967     W. MÖLLER     3,331,972
MAGNETIC CONTROL STICK SYSTEM
Filed April 15, 1964     3 Sheets-Sheet 1
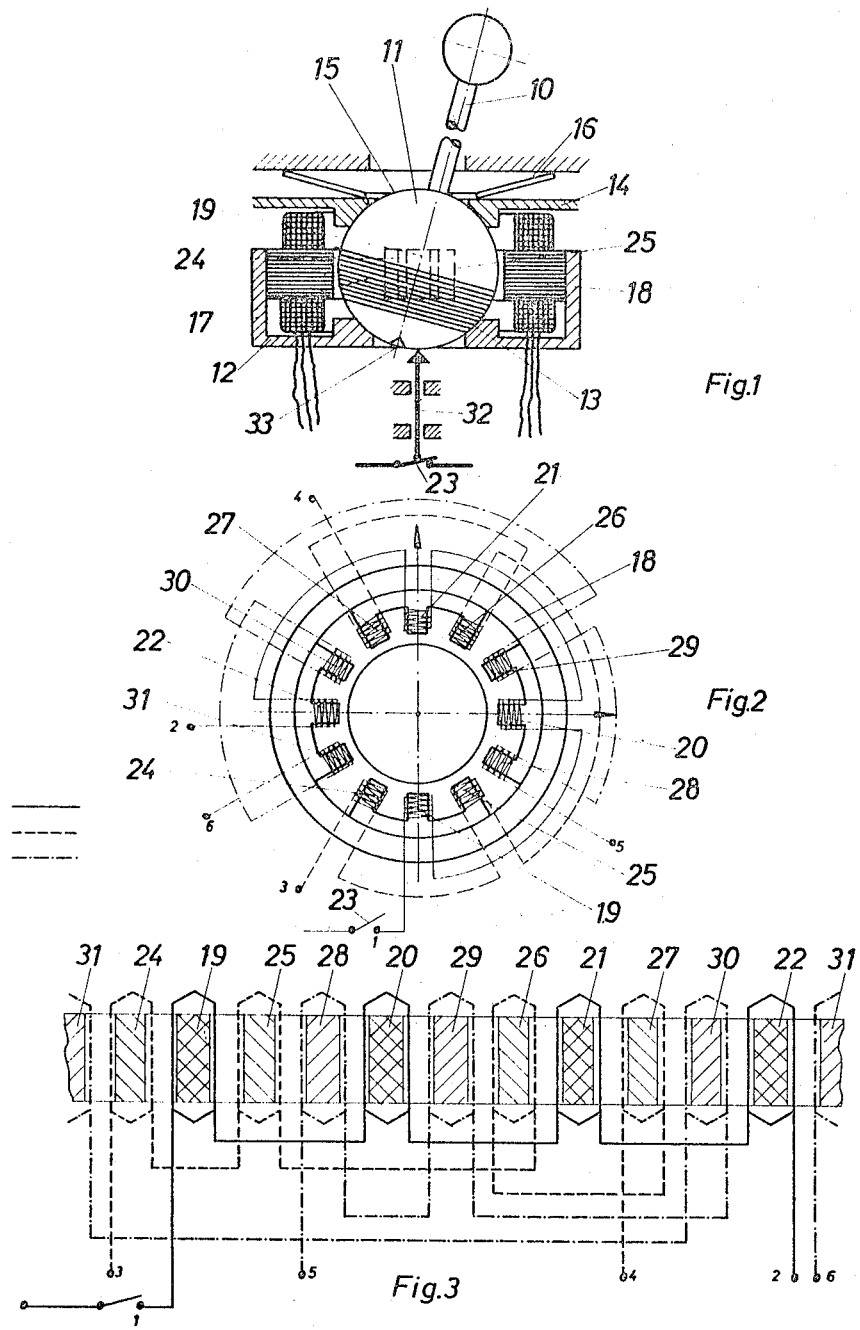
WALDEMAR MÖLLER
*INVENTOR.*

July 18, 1967     W. MÖLLER     3,331,972
MAGNETIC CONTROL STICK SYSTEM

Filed April 15, 1964     3 Sheets-Sheet 2

WALDEMAR MÖLLER
*INVENTOR.*

BY *Andrew L. Vey*

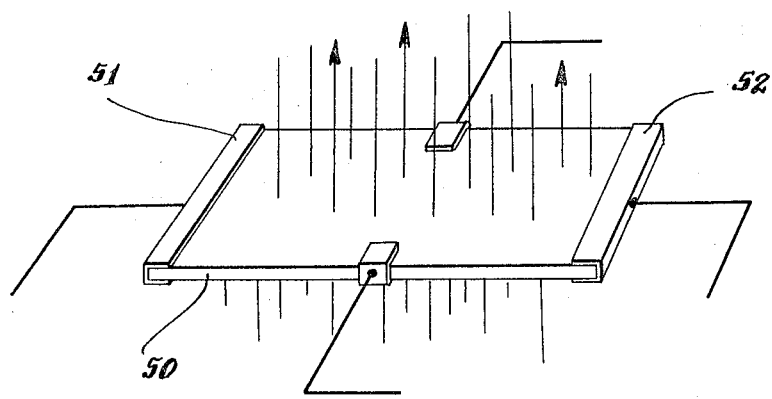

United States Patent Office 3,331,972
Patented July 18, 1967

3,331,972
MAGNETIC CONTROL STICK SYSTEM
Waldemar Möller, Heiligenberg, Baden, Germany, assignor to Bodenseewerk Perkin-Elmer & Co. G.m.b.H., Uberlingen am Bodensee, Germany
Filed Apr. 15, 1964, Ser. No. 360,025
5 Claims. (Cl. 310—10)

The present invention relates to a control stick system particularly useful for steering or controlling airplanes and other types of vehicles. The invention is directed toward the "ball-and-socket joint" type of control wherein control signals are developed from the rotation of a ball within a socket.

One well known technique for sensing the position of a control stick involves the use of a potentiometer having its slider connected to the control stick. On movement of the control stick, the potentiometer slider moves along the potentiometer resistor and electrical signals representative of the movement of the control stick are thus developed. While this arrangement may be adequate for one-dimensional movements of the control stick, it has been found that certain structural difficulties are encountered when this technique is utilized to sense the movement of the control stick in two dimensions.

Another well known arrangement for sensing the movements of control sticks employs inductive or capacitive pick-off systems. In such an arrangement, the control stick is rigidly supported at one end and deflected at the other end. The inductive or capacitive pick-off system is positioned at that end of the stick which is deflected. As the stick is deflected, the values of the inductors or capacitors change accordingly. These changes are sensed and electrical signals representative of these changes are developed. Such arrangements have been found adequate for detecting microscopic deflections of the control stick provided that cost and complexity of the system were not obstacles. In addition, such arrangements possess the very desirable feature that the operator is able to sense the degree and direction of pressure exerted on the stick without requiring a visual check of the movement. However, as already indicated, such an arrangement may involve the design of an extremely complex and costly system. Also, it has been found that the inductive or capacitive pick-off systems are not suitable for sensing macroscopic movements.

It is an object of the present invention to provide a new and improved control stick system.

It is another object of the present invention to provide a ball-and-socket joint control which is simple in construction and inexpensive to fabricate.

It is a further object of the present invention to provide a new and improved ball-and-socket joint control which is not subject to the limitations and shortcomings of presently utilized arrangements.

A control stick system constructed in accordance with the present invention comprises a joint ball having magnetic irregularities and a socket into which the joint ball is fitted. The invention additionally includes means for moving the joint ball in the socket and means for sensing the movement of the electromagnetic irregularities in the joint ball.

For a better understanding of the present invention, together with other and further objects thereof, reference is had to the following description, taken in connection with the accompanying drawings, and its scope will be pointed out in the appended claims.

Referring to the drawings:

FIGURE 1 shows one embodiment of a control stick system constructed in accordance with the present invention;

FIGURE 2 shows the manner in which the excitation and sensing coils used in the FIGURE 1 control stick system may be arranged;

FIGURE 3 shows the excitation and sensing coil of FIGURE 2 drawn into a single plane;

FIGURE 7 illustrates the mode of operation of a Hall generator which may be used in the present invention.

Figure 4:
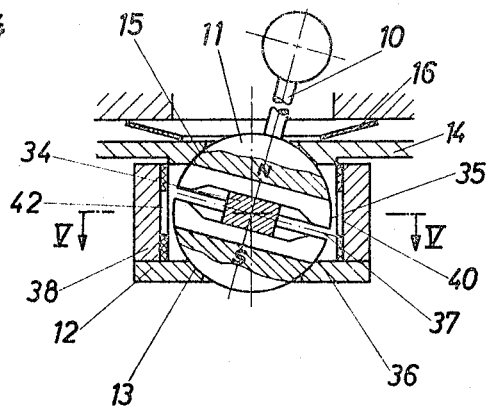
FIGURE 4 shows a second embodiment of a control stick system constructed in accordance with the present invention.

Referring to FIGURE 1, a control stick constructed in accordance with the present invention includes a joint ball 11. Joint ball 11 is so constructed as to have magnetic irregularities. One way of introducing such irregularities is to construct the ball out of aluminum and surround the ball with a layer of ferromagnetic material. The ferromagnetic material is represented by reference numeral 17. Layer 17 may be a packet of dynamo laminations cast integral with the joint ball 11. The ball with the cast in dynamo laminations is machined into its final shape or else subjected to suitable surface finishing. The resulting structure is a ball which is smooth and easily moveable.

The control stick system of FIGURE 1 further includes a socket into which the joint ball 11 and its ferromagnetic layer 17 are fitted. This socket is formed by a bushing 12 having a hollow spherical bearing surface 13 corresponding to the outer surface of the joint ball 11 and a ring 14 having a hollow spherical annular surface 15 also corresponding to the outer surface of joint ball 11. Ring 14 is held tightly against joint ball 11 because of the pressure exerted by a spring 16.

The invention additionally includes means for moving the joint ball 11 in the socket formed by the bushing 12 and the ring 14. This function may be performed by an elongated handle 10 fixed to the joint ball 11.

The system of FIGURE 1 additionally includes means for sensing the movement of the magnetic irregularities in the joint ball 11. This sensing may be accomplished by a packet of laminations 18 which surrounds the joint ball 11 and a plurality of exciting and pick-off coils wound on laminations 18. The manner in which the exciting and pick-off coils are wound may be most readily understood by referring to FIGURES 2 and 3. As shown in these figures, four exciting coils 19, 20, 21 and 22 are physically positioned 90° apart and are connected in series across an alternating voltage source (not shown) between a pair of terminals 1 and 2 by way of a switch 23. Positioned on both sides of the exciting coils 19 and 21 are pairs of pick-off coils 24, 25 and 26, 27 respectively. As is evident from FIGURES 2 and 3, coils 26 and 27 are connected in opposition to coils 24 and 25. If the same voltage is induced in each of the pick-off coils 24, 25, 26 and 27, the resultant signal developed across a pair of terminals 3 and 4 is zero.

In a similar manner, pairs of pick-off coils 28, 29 and 30, 31 are positioned on both sides of the exciting coils 20 and 22 respectively. Coils 30 and 31 are connected in opposition to coils 28 and 29. If the same voltage is induced in each of the coils 28, 29, 30 and 31 the resultant signal developed across a pair of terminals 5 and 6 is zero.

Pick-off coils 24, 25, 26 and 27 may be thought of as the "pitch" pick-off coils so that the signals developed across terminals 3 and 4 may be thought of as representing "pitch" movements. Pick-off coils 28, 29, 30 and 31 may be thought of as the "roll" pick-off coils so that the signals developed across terminals 5 and 6 may be thought of as representing "roll" movements.

Each of the pick-off coils is inductively coupled with the adjacent exciting coil. The magnetic circuit of each such coupling is completed through the packet 17 on the joint ball 11. When the control stick 10 is in its central position, the same voltage is induced in each of the pick-off coils 24–31 inclusive so that the net output signals across terminals 3, 4 and terminals 5, 6 are zero.

When the control stick 10 is moved in the "roll" direction from its center position to a position such as is illustrated in FIGURE 1, the packet 17 of joint ball 11 moves with respect to the packet 18 in such a way that the magnetic coupling between exciting coil 22 and pick-off coils 30 and 31 is increased. This results in an increase in the voltages induced in the pickoff coils 30 and 31. At the same time, the packet 17 moves away from the exciting coil 20 and the pick-off coils 28 and 29 so that the magnetic couplings between exciting coil 20 and pick-off coils 28 and 29 decrease. This results in a decrease in the voltages induced in the pick-off coils 28 and 29. Because pick-off coils 30, 31 are connected in opposition to coils 28 and 29, a resultant signal equal to the difference between the voltages induced in coils 30, 31 and 28, 29 is established across terminals 5 and 6. The magnitude of this resultant signal is dependent upon the amount of deflection of the control stick in the "roll" direction and the phase of this signal is an indication of the direction of deflection.

Since the assumed movement of the control stick 10 was in the "roll" direction only, no voltage is established across terminals 3 and 4 since the magnetic couplings between exciting coil 21 and pick-off coils 26 and 27 change in exactly the same way as do the magnetic couplings between exciting coil 19 and pick-off coils 24 and 25. Thus, when the voltages induced in coils 24 and 25 are added to the voltages induced in coils 26 and 27, the resultant signal is zero since coils 24, 25 are connected in opposition to coils 26, 27. Furthermore, the sum of the voltages induced in the coils 24, 25 or 26, 27 does not change appreciably with a deflection of the control stick 10 about the "roll" axis. The magnetic coupling between exciting coil 19 and pick-off coil 24 and the magnetic coupling between exciting coil 21 and pick-off coil 27 increase to the same extent as the decrease in coupling between the exciting coil 19 and pick-off coil 25, and the decrease in coupling between exciting coil 21 and pick-off coil 26. The resultant signal developed across terminals 3 and 4 is zero since coils 24 and 25 are connected in series as are coils 26 and 27.

With a deflection of the control stick 10 in only the "pitch" direction, a signal is developed across terminals 3 and 4 in the same manner as the development of signals at terminals 5 and 6 for deflections in only the "roll" direction. For a deflection involving a combination of both "pitch" and "roll" signals representative of the direction of deflection are developed across terminals 3, 4 and 5, 6 without either of the signals influencing or affecting the other.

As previously indicated, if the control stick 10 is in its central position no signals are developed across the output terminals 3, 4 and 5, 6. Because this result is difficult to achieve even with the finest balanced pick-off systems, a switch 23 is provided in the input lines which supply alternating current to the exciting coils. Switch 23 is so arranged as to continuously attempt to remain in an open condition. However, with a deflection of the control stick 10 in any direction, switch 23 is kept closed due to member 32 being pushed downward. However, when the control stick 10 is in its central position, member 32 yields into the recess 33 in joint ball 11 thereby permitting switch 23 to open. Such an opening in switch 23 interrupts the current being supplied to the exciting coils and thus prevents the development of signals at terminals 3, 4 and 5, 6 since under such conditions no voltages can be induced in the pick-off coils. Although switch 23 is shown to be in the exciting coil circuitry, it will be obvious that this switch may instead be located in the pick-off coil circuitry.

*Description and operation of FIGURE 4 control stick system*

The control stick system of FIGURE 4 is generally similar to the control stick system of FIGURE 1. Therefore, elements in FIGURE 4 corresponding to elements in FIGURE 1 have been given the same reference numerals.

Figure 5:
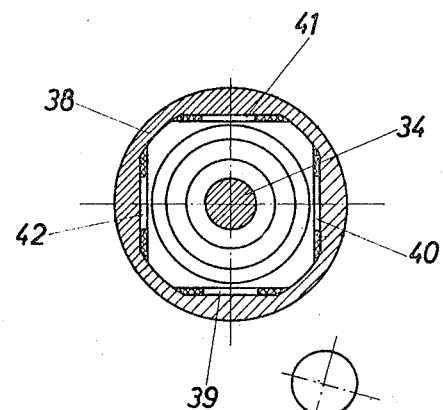
FIGURE 5 is a cross sectional view taken along line V—V of FIGURE 4.

Referring to FIGURE 4, the point ball 11 is seen to include a magnet 34 having two pole pieces 35 and 36 separated from each other by a gap 37 which becomes narrower further along the radius of the ball. FIGURE 5 is a cross-sectional view taken along lines V—V of FIGURE 4. The joint ball 11 is surrounded by a ferromagnetic jacket 38 comprising a cup-shaped receiver with a nonmagnetic bearing body 12 into which the joint ball 11 is fitted. For the arrangement shown in FIGURES 4 and 5, the ferromagnetic jacket 38 is of inner square cross section.

The movement of the joint ball 11 of FIGURE 4 is sensed by a plurality of Hall generators which respond to the magnetic field created by the magnet 34. For the FIGURE 4 arrangement, there are four Hall generators 39, 40, 41, and 42 arranged in the centers of the four sides of the square in the interior of ferromagnetic jacket 38.

Referring to FIGURE 7, a Hall generator comprises a thin lamina 50 of semi-conducting material to which are attached a pair of electrodes 51 and 52. A control current is supplied to the lamina 50 by way of electrodes 51 and 52. If a magnetic field extends through the lamina 50, a Hall voltage is developed which is perpendicular to the direction of the control current flow and is proportional to the magnitude of the control current and the magnetic field.

The four Hall generators receive the lines of magnetic flux which extend outwardly in the area of the north pole of magnet 34 and pole piece 35. The remainder of the magnetic circuit is composed of the ferromagnetic jacket 38, pole piece 36 and the south pole of magnet 34. The lines of magnetic flux extend inwardly in the area of the south pole of magnet 34 and pole piece 36. The four Hall generators are connected electrically in such a way that the signals develop by oppositely disposed generators are effectively in phase opposition. As long as the control stick 10 is in its central position, the Hall generators either are not cut by lines of magnetic flux or are cut uniformly with the same amount of flux entering the generators at their tops as emanates from the generators at their bottoms. Under either condition, no Hall voltages are developed by the Hall generators. Even if voltages were induced under these conditions, they would mutually cancel each other due to the manner in which oppositely disposed Hall generators are connected.

When the control stick 10 is deflected in the "roll" direction as indicated in FIGURE 4, Hall generator 42 is cut by lines of magnetic flux which extend inwardly into the south magnetic pole of magnet 34, while Hall generator 40 is cut by lines of magnetic flux which extend outwardly from the north magnetic pole of magnet 34. The Hall voltages induced in generators 40 and 42 are added with the net signal being a measure of the amount of deflection in the "roll" direction.

Similar results occur for deflections of the control stick 10 in only the "pitch" direction and for deflections having components in both the "pitch" and "roll" directions.

Figure 6:
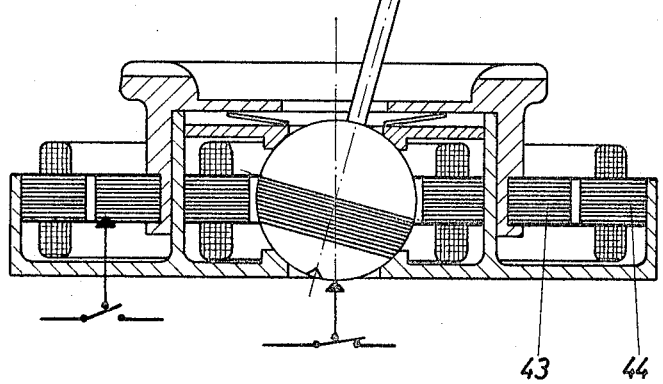
FIGURE 6 illustrates how a control stick system constructed in accordance with the present invention may be combined with additional apparatus so as to control all three degrees of rotational movement of a body.

FIGURE 6 shows how a control stick system constructed in accordance with the present invention may be combined with additional apparatus of conventional construction and operation so as to control a body in all three degrees of rotational movement. Elements in FIG- URE 6 corresponding to elements in FIGURES 1–5 have been given the same reference numerals and a description of these elements will be omitted.

The additional apparatus for sensing the third degree of rotational movement, "yaw," includes a rotatable control member 43. Also included in this additional apparatus is a stator winding 44. As rotatable control member 43 rotates about the "yaw" axis, control signals representative of such rotation are developed.

While there has been described what are at present considered to be the preferred embodiments of this invention, it will be obvious to those skilled in the art that various changes and modifications may be made therein without departing from the invention, and it is therefore aimed to cover all such changes and modifications as fall within the true spirit and scope of the invention.

I claim:
1. A control stick system comprising:
   a joint ball formed of a nonmagnetic material and supporting magnetic irregularities;
   a socket into which said joint ball is fitted;
   means comprising a lever arm attached to said ball for moving said joint ball in said socket by the application of a manual force thereto;
   and means for sensing the movement of said magnetic irregularities.
2. A control stick system according to claim 1 wherein the joint ball comprises a nonmagnetic material surrounded by a layer of ferromagnetic material.
3. A control stick system comprising:
   a joint ball formed of a nonmagnetic material and supporting magnetic irregularities;
   a socket into which said joint ball is fitted;
   a first plurality of windings for developing a plurality of magnetic fields which are directed toward said joint ball;
   means comprising a lever arm attached to said ball for moving said joint ball in said socket by the application of a manual force thereto to traverse said magnetic fields;
   and a second plurality of windings responsive to said traversed magnetic fields for sensing the movement of said magnetic irregularities in said joint ball.
4. A control stick system according to claim 1 wherein the joint ball is a magnet.
5. A control stick system comprising:
   a joint ball including a magnet having a north and a south pole;
   a socket into which said joint ball is fitted;
   means for moving said joint ball in said socket;
   and a plurality of Hall generators responsive to the magnetic field emanating from said north pole and entering said south pole for sensing the movement of said magnet.

References Cited

UNITED STATES PATENTS

| | | | |
|---|---|---|---|
| 1,589,039 | 6/1926 | Anschutz-Kaempe | 308—10 |
| 2,736,869 | 2/1956 | Rex | 336—30 |
| 2,924,633 | 2/1960 | Sichling. | |
| 3,209,602 | 10/1965 | Biderman | 308—10 X |

MILTON O. HIRSHFIELD, *Primary Examiner.*

D. X. SLINEY, *Assistant Examiner.*